July 9, 1963 V. R. DESPARD 3,097,035
ELECTRIC CABLE CONNECTING MEANS
Filed June 16, 1960 3 Sheets-Sheet 1

INVENTOR
VICTOR R. DESPARD

BY Fred. E. Shoemaker,
Fred L. Witherspoon, Jr.
ATTORNEYS

July 9, 1963            V. R. DESPARD            3,097,035

ELECTRIC CABLE CONNECTING MEANS

Filed June 16, 1960                           3 Sheets-Sheet 2

INVENTOR
VICTOR R. DESPARD

BY *Fred. E. Shoemaker, &*
*Fred L. Witherspoon, Jr.*
ATTORNEYS

July 9, 1963     V. R. DESPARD     3,097,035
ELECTRIC CABLE CONNECTING MEANS

Filed June 16, 1960     3 Sheets-Sheet 3

INVENTOR
VICTOR R. DESPARD

BY
ATTORNEYS

United States Patent Office 3,097,035
Patented July 9, 1963

3,097,035
ELECTRIC CABLE CONNECTING MEANS
Victor R. Despard, Syracuse, N.Y., assignor to Pass & Seymour, Inc., Syracuse, N.Y., a corporation of New York
Filed June 16, 1960, Ser. No. 36,679
1 Claim. (Cl. 339—99)

This invention relates to electric cable connecting means and more particularly to connectors for use between sections of flexible multi-conductor cable as used with portable or movable electric power consuming equipment and further for connecting a cable to a fixed power outlet or to a portable or movable consuming unit.

It is a general object of the present invention to provide novel and improved electric cable connector means.

More particularly it is an object of the invention to provide in an electric cable connector simplified means for attaching the stranded conductors of a cable to the connector contacts.

An important object of the invention consists in the provision of a connector having a two-part insulation body, one part providing a cable entry opening and a surface substantially normal to the axis of the opening grooved to receive the insulated cable conductors separately, the second part carying connector contacts each connected to a pin positioned to enter and electrically contact one of the cable conductors in its groove when the parts are brought together.

Another important object of the invention consists in the provision of conductor insulation engaging means in each of the grooves in the first insulation part serving the dual function of temporarily holding each conductor in its groove until the parts are assembled and of acting as strain relief means during use of the connector.

A further important object of the present invention consists in the provision of a deep hole at the outer end of each conductor receiving groove, the axis of which is substantially normal to the groove axis, to receive the bent-over end of the conductor therein to hold it in position in the groove until the connector parts are assembled to insure proper penetration of the connector pin into the strands of the conductor.

Still another important object of the invention consists in the arrangement of the connector contacts and conductor contacts in one of the insulation parts whereby they are electrically and mechanically connected to each other and secured to said part.

A feature of importance in the connector construction resides in the provision on the mating face of the insulation part carrying the connector contacts of projections other than the contact pins for engaging the conductor insulation between the pin and the center cable passage to provide additional strain relief.

Other and further objects and features of the invention will be more apparent to those skilled in the art upon a consideration of the following specification and accompanying drawings wherein is disclosed a single, exemplary embodiment of the invention with the understanding that such changes and modifications may be made therein, as fall within the scope of the appended claims, without departing from the spirit of the invention.

Electric cable connecting means take many forms, are provided in numerous styles, sizes, and current capacities, and in the better grades are available not only with various numbers of contacts but in a great variety of contact arrangements and dispositions and some lines even provide interlocking mechanism often simply actuated by a slight partial rotation after longitudinal engagement of the two components of the connector. Whatever the style, size and contact number, one of the principal problems with either of the components which are generally designated male and female for plug and receptacle, is the means for attaching the conductor wires to the contact terminals in such a manner as to facilitate this attachment, reduce the time required for the operation, insure good contact over a long period of use and to provide for strain relief so that the conductor itself and its connection to the terminals is not likely to be damaged or the parts separated by rough usage which may exert undue tension on the cable or between the cable and one or more of the connector parts.

In accordance with the present invention the various problems are solved by dividing each component of the complete connector into a forward or contact carrying part and a rear or cable engaging part, equipping the parts with orienting mechanism and securing means for joining them together and providing in the cable cooperating part means to securely hold the individual unstripped conductors in a predetermined fanned-out relationship where they may be each penetrated by a conductor pin on the contact carrying part. The fanning out operation deflects the conductors substantially to an angle of 90 degrees in respect to the axis of the cable, and insulation engaging and clamping means for each conductor contributes further to the strain relief while centering the conductors for accurate alignment with the conductor penetrating pins on the other part. In this manner from two to four or more conductors, the usual maximum number for heavy current carrying cables, can be arranged in a unit of minimum size and wiring can be achieved rapidly since all the insulation that need be removed is a short section of the outer covering or cable sheath which binds the several individually insulated conductors together. No bared conductors, which are usually stranded and hence offer problems of stray strand interconnection, are exposed and no terminal connecting screws are required. The only fastening means used are simple screws joining together the two parts of each connector unit and these are so arranged that inter-action between the connector part and the cable due to manipulations and handling have no effect toward loosening the screws.

The cable connectors about to be described are illustrated in connection with the so-called "midget" size 10-ampere "Turnlok" type of connector, shown larger than usual, but obviously are applicable with equal facility to many other styles.

Figure 1:
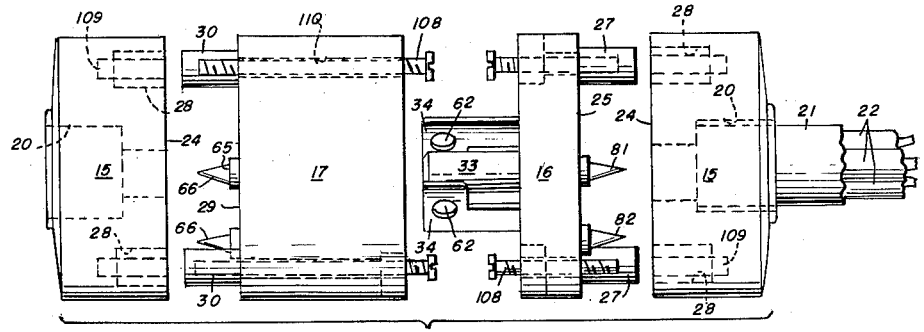
FIG. 1 is an exploded view in side elevation of a pair of electric cable connectors, the male component thereof illustrated with a three wire cable end positioned in the rear part thereof prior to assembly of this part and the forward part.

Referring now to the drawings, and first to FIGURE 1, for a better understanding of the invention, there are shown in this FIGURE, in exploded form, complete male and female connector units adapted to be mated to join two sections of cable electrically and mechanically. Each component of the completed connector comprises a rear or cable entry part 15, these parts being identical in both units for simplicity of manufacture, stocking, and the like. The forward part 16 of the male component of the connector mounts contacts on its forward face which project outwardly to be received in correspondingly shaped recesses in the forward portion 17 of the female component which houses the corresponding engaging contacts.

Each of the rear sections 15 is circular in plan and has a central axial opening 20 preferably of a diameter to closely engage the sheath 21 of a multi-conductor cable, here shown as containing three individually insulated conductors 22. For operation with the connecting means of the present invention, the conductors themselves must be stranded, i.e. formed from a plurality of small gauge wires twisted into a circular bundle and maintained in this form preferably by a covering of strong but flexible plastic or other suitable insulating material.

Both the rear and forward parts of the two components of the connector are preferably cylindrical and all of the same diameter. The forward face 24 of each of the rear or cable engaging sections is flat and the rear face 25 of the male section 16 is also flat to closely engage it. One or the other of the parts, preferably the forward section, is provided with at least two cylindrical, rearward projections 27 non-symmetrically disposed thereon for cooperation with correspondingly positioned recesses 28 in the opposed part 15 whereby they may be brought together with faces 24 and 25 engaging in only one angular relationship. In connection with the female component, the flat rearward face 29 thereof is shown as provided with integral projections or inset pegs or dowels 30 similarly disposed to be received in the corresponding recesses 28 in the rear section alloted to it.

Figure 8:
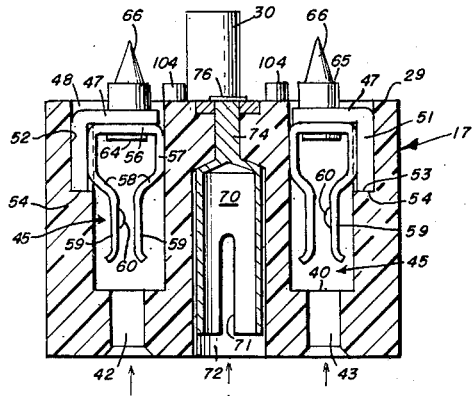
FIG. 8 is a longitudinal, central section through the forward part of the female component taken on line 8—8 of FIG. 4 and illustrating all of the connector terminals therein.
Figure 9:
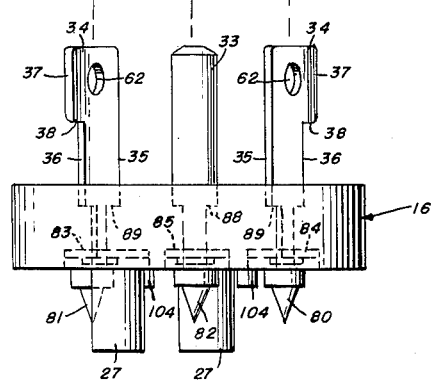
FIG. 9 is a side elevation of the forward part of the male component positioned in respect to the mating component shown in FIG. 8 for engagement by direct upward movement.

The types of contacts used for interconnecting the two components of the connector, and for completing the electric circuits of the conductors attached to each, bear no specific relationship to the means for attaching the conductors electrically and mechanically to the connector contacts but are illustrated only as an example of a workable arrangement. FIGS. 8 and 9 perhaps best illustrate the arrangement. Here the forward insulation disk 16 of the male component is shown fitted and projecting from its forward face with a straight, cylindrical, solid contact 33 axially disposed thereon, and also with a pair of identical, generally flat contacts 34 lying on the same diameter of the disk 16 and on opposite sides of the cylindrical contact. These contacts extend parallel to the center contact 33 and are preferably of the same length. Each of these contacts has a full length straight side or edge 35 and a parallel edge 36 extending only part way out from the disk 16 and the remainder of the blade is widened to provide the edge 37, parallel to 35 but further spaced from it than 36, forming the shoulder or overhang 38. These shoulders on the two contacts are adapted to engage beneath locking shoulders 40 in the companion part 17 when the contacts are entered into slots in the latter part and rotated for a few degrees in a clockwise direction, thereby locking the two parts together against direct pull withdrawal.

Figure 4:
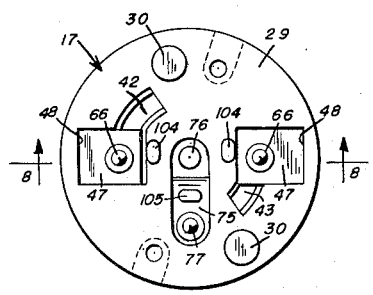
FIG. 4 is a plan view of the inner face of the forward part of the female component.
Figure 5:
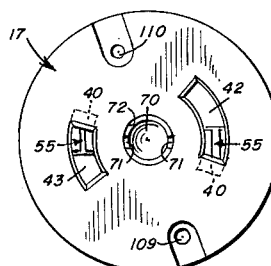
FIG. 5 is a plan view of the outer or mating face of the female component.
Figure 6:
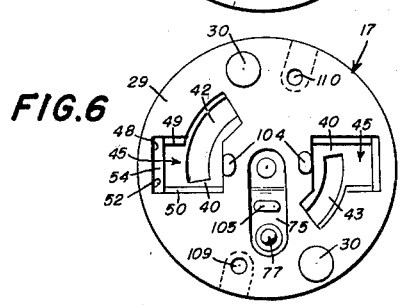
FIG. 6 is a view similar to FIG. 4 but showing the forward part of the female component with the outer conductor-pin, connector-terminal units removed therefrom.

Since the two components of the connector must be slightly rotated for this locking action and since the widened ends of the blades 34 engage between spring contacts in the female component both during the inserting operation and subsequent to the rotation, the blades must be curved transversely to be partly annular in cross-section and the slots 42 and 43 in which they are received in the front wall of member 17 are likewise curved as seen in FIGS. 4, 5, and 6, one 42 being of greater arcuate length than the other in the event that it is desired to polarize the connector by making one of the blade ends 37 of greater width than the other.

Figure 7:
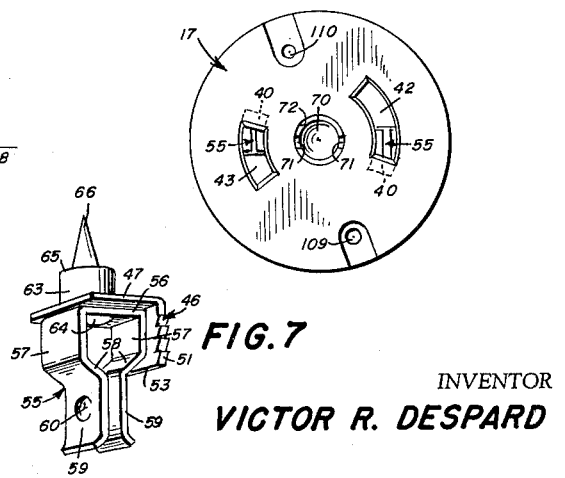
FIG. 7 is a perspective view of one of the identical outer conductor-pin, connector-terminal units.

FIGURE 6 shows the rear face of the forward component of the female connector member with the two contact blade engaging assemblies, such as illustrated in FIGURE 7, removed therefrom. The irregular shaped chambers 45, which are identical with each other so that only one need be defined, open through the rear face of the part 17 and meet, within the block, the rearward ends of the arcuate blade receiving openings 42 and 43, clearly seen in this FIGURE.

The chambers are shaped to receive the contact and pin assemblies of FIGURE 7, each including the L-shaped member 46 bent up of heavy sheet metal having the flat rectangular top section 47 adapted to fill the outer rectangular opening 48 with the edges thereof resting on the shelves 49 and 50 adjacent the opposite side walls and spaced below the end surface 29 of member 17 a distance substantially equal to the thickness of metal plate 47, whereby when it is positioned as seen in FIGURE 4 its surface is substantially flush with that of the block 17. The face of right-angled arm 51 integral with plate 47 is received against wall 52, its lower edge 53 bears against shelf 54 to insure against tipping of the contact and pin assembly and its edges are serrated as seen in FIG. 7 to hold the assembly in place between the side walls of chamber 45 which are spaced closer than the distance across the serrations so as to require forcing the assemblies into place.

Plate 47 is appropriately pierced for assembly of spring contact 55 and the conductor penetrating pin. The spring contact 55 is bent up from bronze or similar heavy spring metal and includes a flat base 56, spaced arms 57 extending at right angles from the ends of the base, the converging parts 58 and the flared end contact arms proper 59 extending parallel to each other and somewhat closer together than the thickness of the ends of the contact blades 34 which they are to receive between them. One of the arms 59 has a struck-out protrusion 60 to be received in one of the openings 62 in the end portion of the corresponding contact blade as a spring interlock to hold the blade in its partially rotated position in a manner well understood in connection with attachment plug blades.

The base 56 of the spring contact fits closely against the undersurface of plate 47 and is secured thereto by a rivet passing through holes in the base and the plate. This rivet extends from beneath the cylindrical head 63 which rests on top of plate 47 and is upset at 64 to act as a rivet to hold the three parts together. The head 63 is of a substantial diameter, i.e. about the same as that of the covering of the individual conductors 22, and has a flat shoulder 65 from which springs the sharply conical pin 66.

The spring contact and wire penetrating pin assembly of FIGURE 7 is received by being pressed into its recess 45 in the part 17 where it is held, when the parts of the female component are disassembled, by the closeness of fit of the outer one of the arms 57 of the spring contact and the turned down portion 51, which engage against the inner and outer walls of recess 45 as seen in FIGURE 8 with sufficient springiness to insure the assembly remaining in place during the brief time that the two sections of the coupling unit are separated for wiring. The serrations on the edges of 51 also engage and hold in the walls of recess 45.

The third or central contact in the member 17 is seen at 70 in FIGURES 5 and 8 and comprises a tube of brass or the like, longitudinally split, as seen at 71, so that it may slightly expand when receiving the solid pin 33, and is received in a central aperture 72 in the block 17. The closed inner end of tube 70 is provided with a rivet extension 74 passing through an appropriate opening in the block of smaller diameter than 72 and coaxial therewith and received in an aperture in the conductor plate 75 extending radially from this aperture on a diameter at right angles to that passing through the pins 66. The extension 74 is riveted over as at 76 to secure the plate in position in a recess in the front face of block 17. The remote end of plate 75 is fitted with a conductor penetrating pin 77 which has a shoulder corresponding to that shown at 65 in FIGURE 7 and a point like that shown at 66 in that FIGURE. As seen in FIGURE 4 the three penetrating pins are equidistantly arranged from the center of block 17 and spaced at 90 degree intervals.

Figure 3:
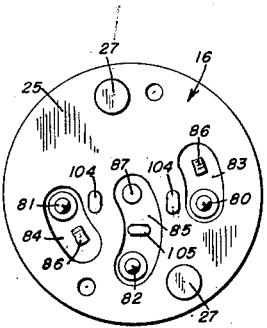
FIG. 3 is a plan view of the inner face of the forward part of the male component.

The rear face of the male contact blade carrying disk 16 is seen in FIGURE 3 and is effectively arranged the same as the one seen in FIGURE 4, with three contact pins 80, 81 and 82, each identical with the parts 66, 77, and 66 of FIGURE 4. They likewise have integral rivets which secure them respectively in metal plates 83, 84 and 85. These plates fit in recesses slightly deeper than their thickness in the face of disk 16 and each is secured to its corresponding contact by an integral shank on that contact passing through the disk 16 and through an appropriate opening in the corresponding plate where it is riveted over. The shanks of the curved blades are seen passing through the plates in FIGURE 3 at 86 and the central shank at 87. FIGURE 9 shows the contact blades reduced at 88 and 89 where they are embedded in disk 16 to provide the shanks and abutments to engage shoulders in the disk to resist movement therein.

Figure 11:
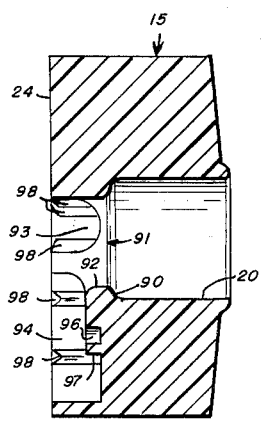
FIG. 11 is a central longitudinal section through a rear part taken on line 11—11 of FIGURE 10.
Figure 10:
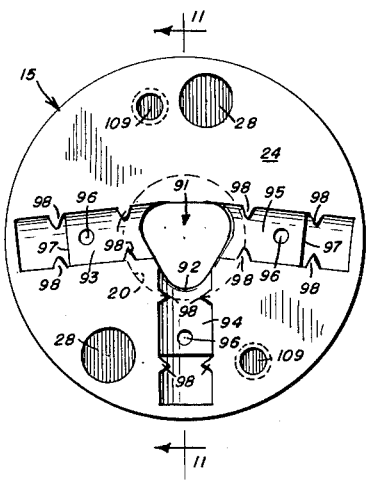
FIG. 10 is a plan view of a rear part similar to FIG. 2 but on a larger scale and without the conductors.

Referring now to FIGURES 10 and 11 which illustrate on an enlarged scale the construction of one embodiment of the rear or cable engaging portion of each component of the connector, it will be seen that the opening 20, sized to freely pass the sheath 21 of the multiconductor cable does not extend entirely through the insulation disk 15 in its large cylindrical form but is reduced in size near the forward face of the disk to provide shoulder 90 against which the end of the cable sheath is abutted. The hole then continues through the block in a generally triangular configuration 91, FIGURE 10, the apices 92 of the triangle being rounded on a radius not substantially greater than that of the insulation coverings of the individual conductors. In fact, the opening 91 is sized to pass these three conductors loosely and is intersected by the nearly radial channels 93, 94, and 95 in the forward face of the disk and each having parallel side walls and an arcuate bottom, as seen in FIGURE 11, and sized to relatively closely engage the insulation on each of the conductors 22 which are flared out into these channels by bending each at right angles to the axis of the main cable section. In order that they may fit and substantially fill the lengths of these channels, the conductor sheath is initially cut back to a predetermined distance, preferably as indicated by a gauge for the purpose.

Channel 94 is radial and extends from one of the rounded tips of the triangular opening 91 while the channels 93 and 95 are not diametrically disposed but extend rather from near the other pair of tips of opening 91 slightly angled to each other, as shown, so that at the positions where they will be intersected by the penetrating pins on one of the other connector parts they are properly disposed to receive these pins centrally. Thus three radii from the center of disk 15 and 90 degrees disposed to each other will pass through the centers of the three recesses 96 which are provided in the channel bottoms to receive the tips of the conductor penetrating pins on the forward part of the component which is properly assembled with disk 15.

The outer end of each of the channels 93, 94, and 95 may be increased somewhat in depth forming shoulders 97. Spaced substantially equidistantly in either direction from recess 96 in each channel is a pair of inwardly projecting facing ridges 98 provided with sharp edges and relieved upper ends to facilitate the introduction of the conductors into the position illustrated in FIGURE 2. The sharp facing edges of these ridges are spaced apart a distance not substantially greater than the diameter of the conductor bundle in the wire intended to be received in the channel and the channels have a width not substantially greater than the over-all diameter of the insulation on these conductor bundles. Thus when the conductors are pressed down into the channels the insulation thereon is constricted, but not cut, by the ridges and the conductor and its insulation at the engagement points and adjacent is compressed and distorted into a generally elliptical shape, illustrated in plan in FIGURE 2, which shows one of the parts 15 separated after it has been assembled so that the conductors were penetrated by the penetrating pins such as 66, seen in FIGURE 7. Openings 99 in the several conductors show where they have been penetrated by the conductor pins and the surrounding circular areas 100 represent the flattening effect produced by the shoulders 65 on the pins. This causes a tight compression of the wire bundle about the pin and assures tight and continuous engagement thereof with the conductors of the bundle which it penetrates.

The sharp ridges 98 have a second function, that of centering each conductor in its groove, whether it be the maximum size suitable for use with the connector or one of the smaller sizes whose insulation diameter is not substantially greater than the distance between the edges of facing ridges. This insures the presentation of the conductor strands to properly and centrally receive one of the pins 66 or 80. Moreover the ridges engage the wire insulation to hold the individual conductors in position in the grooves until the cap is placed in position.

Figure 2:
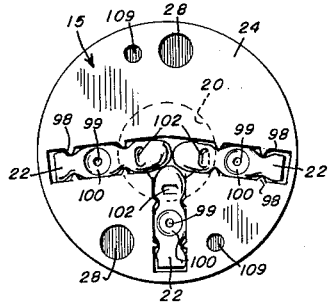
FIG. 2 is a plan view of the inner face of the rear part of the male component of the pair as illustrated in FIG. 1 with the individual conductors of the cable shown in position, the rear part of the female component being identical.

To further improve the strain relief effect, and to complement that achieved by the pairs of ridges 98, the main body part or forward section of each connector has protuberances extending from its rear face positioned to bear on the surface of the individual conductors in their grooves in the disk 15 and the resultant effect of these is illustrated at 102 in FIGURE 2 by depressions, shaped like the tips of these protuberances, which have impressed in the insulation of the several conductors.

FIGURE 3 illustrates at 104 two of these projections formed integral with the material of the block 16 on the male member. They are also visible in FIGURE 9. The third protuberance 105 must be formed on strap 85 connecting the central pin to the conductor penetrating pin 82. Corresponding parts illustrated in FIGURE 4 bear the same reference characters.

As can be seen for instance in FIGURES 8 and 9, the locating pins 27 on the male member and 30 on the female member have the maximum protrusion, of any part, from the rear face of the component from which they extend, whereby when bringing this component into engagement with the cable carrying part, which has already been fitted with its cable with the flared conductors pressed in the grooves as seen in FIGURE 2, alignment is achieved by cooperation of these pins and the corresponding sockets for them in the companion part positively assuring that the conductor penetrating pins are properly aligned and centered over the conductors in the channels 93, 94, and 95 in the cable holding portion. The two parts are strongly pressed together, using the fingers and thumbs, causing the pins to penetrate the conductors and make engagement therewith. The fastening screws 108 seen in FIGURE 1 are arranged two to each main part and extend into threaded sockets 109 in the rear part 15 to be associated therewith. As seen in FIGURE 5, counterbores 110 may be provided in the face of the principal member of the connector to receive the heads of the screws and may, as seen in this same figure, be connected to the edge of the insulation disk by a channel to eliminate a narrow rim which might subsequently be damaged. Tightening of the screws draws the two sections of the connector closely together until their faces engage, insuring full penetration of the contacting pins and compression of the insulation on the indivdual conductors by the shoulders on these pins and also by the secondary stress relieving blocks 104 and 105.

A second embodiment of the invention is intended to insure the indivdual conductors remaining in their grooves in the forward face of the cover or cable engaging portion of each connector part under such adverse conditions as very low temperatures which rigidify the plastic insulation of the conductors which may cause them to pop out of their grooves in spite of the gripping of the ridges 98 as pointed out above.

The modification consists in converting the depression beyond the shoulder 97, near the end of each wire receiving groove into a deep hole 197 whose axis is substantially parallel to axis of the connector.

Figure 12:
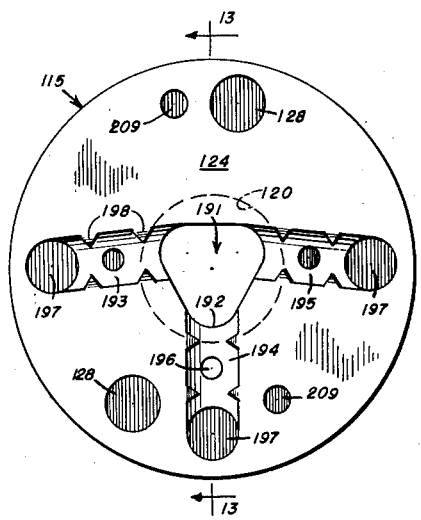
FIG. 12 is a view similar to FIG. 10 but illustrating a second embodiment having additional wire holding means for use prior to and during assembly of the two parts of a connector.
Figure 13:
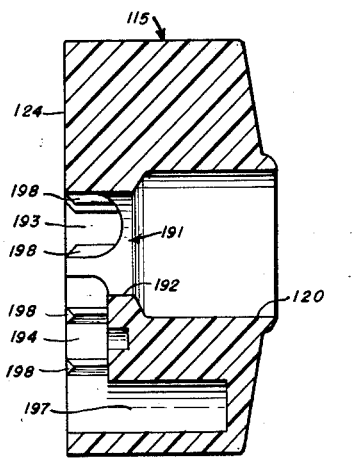
FIG. 13 is a view similar to FIG. 11 but taken on line 13—13 of FIG. 12.

FIGURES 12 and 13 illustrate this arrangement and in these figures the reference characters are similar to those in the first embodiment with the addition of 100 to each.

The new arrangement requires that the insulation engaging ridges 198 and the holes 196 for the tips of the pins 66 or 80 be moved slightly closer to the center of aperture 120 or rather to the apices 192 of the triangular inner configuration thereof. Thus the inner and outer sets of ridges 198 as shown in FIGURES 12 and 13 are somewhat closer together than the corresponding parts in the first embodiment since the holes 197 now occupy spaces formerly occupied by the outer sets of ridges. Pins 66 and 80 will require appropriate moving to register with holes 196.

In use the cable outer sheath 21 is cut back to a distance greater than in the first embodiment by an amount substantially equal to the depth of a hole 197 and after the individual conductor ends have been passed through hole 120 they have their ends bent over at right angles and tucked into holes 197. The engagement of these ends with the walls of the holes provides frictional resistance to hold the wire ends therein against the tendency to straighten at the bends about the inner edges 192 of center passage 120. Thus the otherwise insufficient frictional engagement of the ridges 198 with the insulation of the conductor is adequate to hold them properly in their grooves or radial channels 198, 194 and 195 until the mating part with the penetrating pins is assembled thereon.

Connectors constructed as just described are of minimum size for their duty, are simple and quick to wire, are sturdy, need no extraneous strain relief devices and insure long effective life and usefulness.

This application is a continuation-in-part of my co-pending application Serial No. 842,236, filed September 25, 1959 for Electric Cable Connecting means.

I claim:

In an electric wiring device of the character described, a two-piece body consisting of front and rear one-piece discs of insulating material having flat confronting faces; the rear disc having a central axial opening therethrough for the passage of an electric cable of at least three insulated, stranded conductors; straight grooves extending divergently at irregular angular intervals from said opening through said confronting face and each terminating in a blind hole parallel to said opening and near the disc edge and each groove and hole sized to closely receive a fully insulated, stranded conductor from said cable of the largest required electrical capacity for the particular wiring device, each groove having flat, parallel side walls and a semi-cylindrical bottom, means in each groove integral with the disc and extending from the side walls only to center a conductor of less than groove width therein; the front disc only mounting conducting parts including for each of the above grooves a forwardly ex-extending connector contact and a conical piercing point contact, the latter projecting from the confronting face at the same irregular angular intervals as said grooves to enter therein to at least the depth of said grooves, each point contact projecting from a shoulder which extends rearwardly beyond its disc face and sized to enter its cooperating groove and compress and pack the stranded wires about the conical point for good contact therewith; at least two pairs of interengaging surfaces integral with said discs and one of each pair extending outwardly from one of said faces a greater distance than said points and the other of each pair extending inwardly from the other face and said pairs being non-symmetrically positioned on the discs to interengage in only one position to thereby accurately register each point with the center of a corresponding one of said grooves for centrally piercing of the conductor therein; and separate means to secure the discs together and force the points into the conductors.

References Cited in the file of this patent

UNITED STATES PATENTS

| 2,071,445 | Wolf | Feb. 23, 1937 |
| 2,159,064 | Walter | May 23, 1939 |
| 2,235,231 | Mattis | Mar. 18, 1941 |
| 2,563,712 | Frei et al. | Aug. 7, 1951 |
| 2,567,783 | Richardson | Sept. 11, 1951 |
| 2,709,246 | Abbott | May 24, 1955 |
| 2,726,373 | Bramming | Dec. 6, 1955 |
| 2,751,568 | Despard | June 19, 1956 |
| 2,802,083 | Lapeyre | Aug. 8, 1957 |
| 2,924,806 | Hubbell et al. | Feb. 9, 1960 |

FOREIGN PATENTS

| 969,956 | France | May 31, 1950 |
| 1,002,046 | France | Oct. 31, 1951 |